(12) United States Patent
Kawakita et al.

(10) Patent No.: US 8,424,475 B2
(45) Date of Patent: Apr. 23, 2013

(54) AIR BUBBLE RECOVERY DEVICE OF SHIP

(75) Inventors: Chiharu Kawakita, Tokyo (JP); Yoichiro Kodan, Tokyo (JP); Shinichi Takano, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 158 days.

(21) Appl. No.: 13/017,338

(22) Filed: Jan. 31, 2011

(65) Prior Publication Data

US 2011/0239927 A1 Oct. 6, 2011

(30) Foreign Application Priority Data

Apr. 1, 2010 (JP) ................................. 2010-085479

(51) Int. Cl.
*B63B 1/38* (2006.01)

(52) U.S. Cl.
USPC .......................... 114/67 A; 114/289

(58) Field of Classification Search ............... 114/67 A, 114/67 R, 74 A, 74 R, 289
See application file for complete search history.

(56) References Cited

U.S. PATENT DOCUMENTS

| | | | | |
|---|---|---|---|---|
| 3,289,623 A | * | 12/1966 | Gray et al. | 114/67 A |
| 3,455,267 A | | 7/1969 | Tucker | |
| 3,595,191 A | * | 7/1971 | Grundy | 114/67 A |
| 5,456,201 A | * | 10/1995 | Bobst | 114/289 |

FOREIGN PATENT DOCUMENTS

JP 2009-248831 10/2009

OTHER PUBLICATIONS

International Search Report, International Preliminary Report on Patentability and Written Opinion of the International Searching Authority issued Apr. 26, 2011 in International (PCT) Application No. PCT/JP2011/051906 w/partial English translation.

* cited by examiner

*Primary Examiner* — Lars A Olson

(74) *Attorney, Agent, or Firm* — Wenderoth, Lind & Ponack, L.L.P.

(57) ABSTRACT

An air ejecting unit is configured to eject air into water from an air ejecting outlet provided in a ship bottom of a ship body. An air recovery device is configured to recover the air into the ship body from first to third air recovery inlets provided in the ship bottom. The first air recovery inlet is provided to cross the center line. The second air recovery inlet is provided to project on a port side from the first air recovery inlet. The third air recovery inlet is provided to project on a starboard side from the first air recovery inlet. The second and third air recovery inlets are arranged on a bow side from the first air recovery inlet. Each of the first to third air recovery inlets includes a plurality of air recovery holes.

10 Claims, 10 Drawing Sheets

AIR BUBBLE RECOVERY DEVICE OF SHIP

INCORPORATION BY REFERENCE

The present application claims a priority on convention based on Japanese Patent Application No. 2010-085479 filed on Apr. 1, 2010. The disclosure thereof is incorporated herein by reference.

BACKGROUND OF THE INVENTION

I. Technical Field

The present invention relates to a frictional resistance reduced ship in which frictional resistance of a ship body is reduced by ejecting air into water.

II. Description of the Related Art

A technique is known in which frictional resistance of a ship body is reduced by covering a ship bottom surface with a flow of air bubbles at the time of navigation. When the air bubbles are taken in the propellers, problems occur such as reduction in propulsion efficiency and increase in propeller vibratory force.

Japanese Patent Publication JP 2009-248831A discloses an air bubble introduction preventing device for preventing air bubbles from being taken in a propeller. The air bubble introduction preventing device has an air bubble inlet provided in a ship bottom on the side of the stern, and a gas-liquid separation chamber. Seawater which includes the air bubbles, is taken therein from an air-bubble inlet, and is separated into air and seawater in the gas-liquid separation chamber. The air as a result of the separation is emitted to the atmosphere.

SUMMARY OF THE INVENTION

A frictional resistance reduced ship, according to a first aspect of the present invention, has an air ejecting unit configured to eject air into water from an air ejecting outlet provided in a ship bottom of a ship body of the ship, and an air recovery device configured to recover the air into the ship body from an air recovery inlet provided in the ship bottom. The air recovery inlet is arranged on the side of a stern compared to the air ejecting outlet and on the side of a bow compared to a propeller provided to the ship body. The propeller is arranged on a center line of the ship body. The air recovery inlet is provided with a central air recovery inlet that crosses the center line, a port-side air recovery inlet that is not on the center line but on a port side so that the port-side air recovery inlet projects on the port side compared to the central air recovery inlet, and a starboard-side air recovery inlet that is not on the center line but on a starboard side so that the starboard-side air recovery inlet projects on the starboard side compared to the central air recovery inlet. The port-side air recovery inlet and the starboard-side air recovery inlet are positioned on the bow side compared to the central air recovery inlet. Each of the central air recovery inlet, the port-side air recovery inlet, and the starboard-side air recovery inlet includes a plurality of air recovery holes.

A first width of the central air recovery inlet in a ship width direction is larger than a second width of the port-side air recovery inlet in the ship width direction and a third width of the starboard-side air recovery inlet in the ship width direction.

Each of the central air recovery inlet, the port-side air recovery inlet, and the starboard-side air recovery inlet is formed in a belt-like shape extending in the ship width direction.

The central air recovery inlet is formed in a belt-like shape extending in the ship width direction. Each of the port-side air recovery inlet and the starboard-side air recovery inlet is formed in a belt-like shape extending obliquely with respect to a ship length direction so that the respective ends of the port-side air recovery inlet and the starboard-side air recovery inlet on the side of the stern are close to the center line, and the other ends on the side of the bow are far from the center line.

The air recovery device has a gas-liquid separation chamber configured to separate the air from the water.

The ship bottom is formed to be a flat surface.

The air recovery device ejects the air into the water from a first air re-ejecting outlet provided on the ship body. The first air re-ejecting outlet is arranged on the side of the stern compared to the air recovery inlet so as not to be arranged below the propeller when the ship body is viewed from the stern 12.

The first air re-ejecting outlet is arranged on the side of the bow compared to the propeller so as to be arranged above the propeller when the ship body is viewed from the stern.

The first air re-ejecting outlet is arranged only outside the width of the propeller when the ship body is viewed from the stern.

The air recovery device ejects the air into the water from a second air re-ejecting outlet provided to the ship bottom. The second air re-ejecting outlet is arranged on the stern side compared to the air ejecting outlets and on the bow side compared with the air recovery inlets.

According to the present invention, the frictional resistance reduced ship is provided which reduces frictional resistance of the ship body by ejecting the air into the water, and which prevents air bubbles from being taken in a propeller while securing and maintaining the strength of the ship body.

BRIEF DESCRIPTION OF THE DRAWINGS

The above objects, other objects, effect, and characteristics of the present invention will be more clarified from description of embodiments together with the attached drawings.

DETAILED DESCRIPTION OF THE INVENTION

Hereinafter, the frictional resistance reduced ship according to the present invention will be described below with reference to the attached drawings.

First Embodiment

Figure 1A:
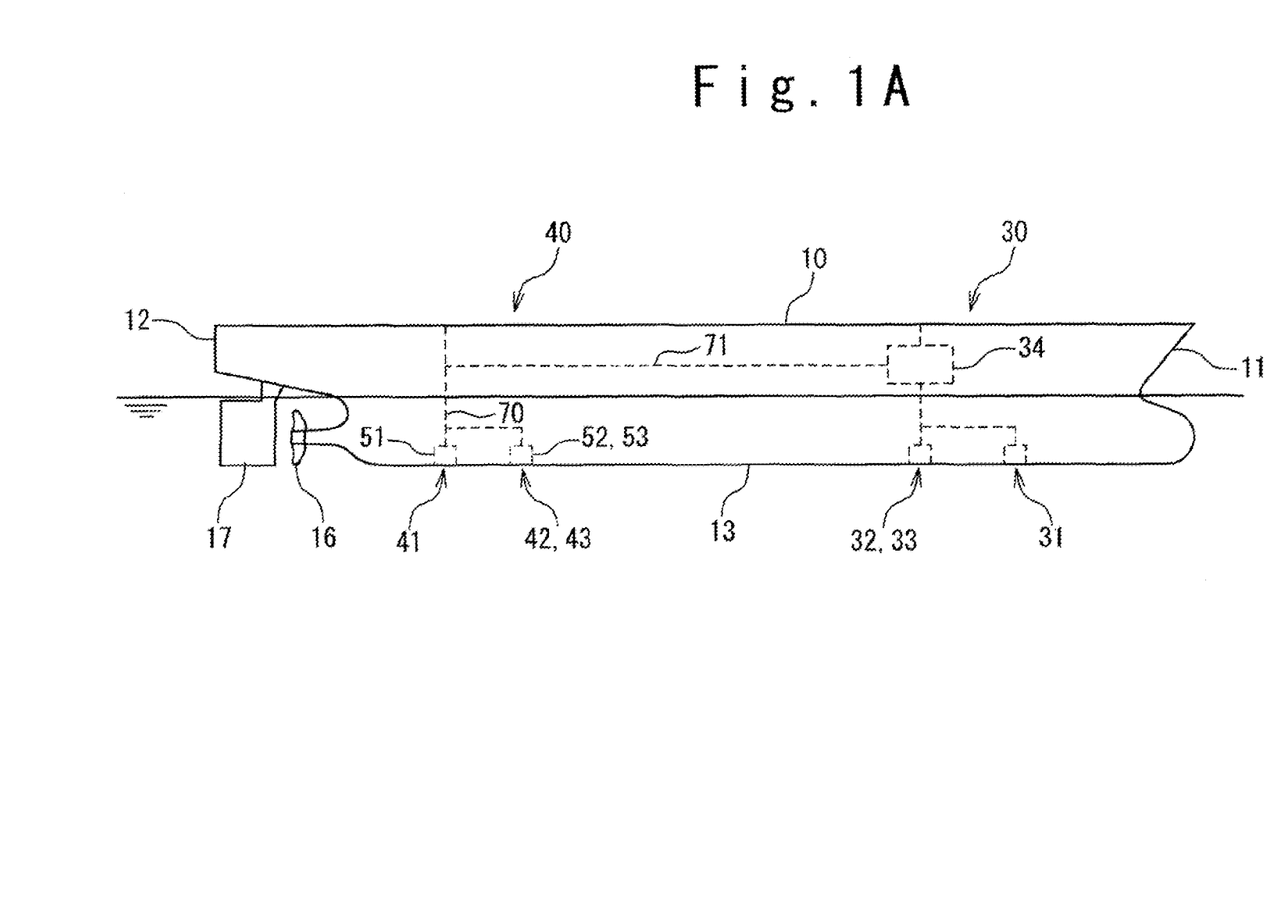
FIG. 1A is a side view of a frictional resistance reduced ship according to a first embodiment of the present invention.

With reference to FIG. 1A, the frictional resistance reduced ship according to the first embodiment of the present invention has a ship body 10, an air ejecting unit 30 provided to the ship body 10, and an air recovery device 40 provided in the ship body 10. The ship body 10 has a bow 11, a stern 12, a ship bottom 13, a propeller 16, and a helm 17.

The air ejecting unit 30 has air ejecting outlets 31 to 33 provided on the side of the bow 11 of the ship bottom 13, and a compressor or a blower 34.

The air recovery device 40 has air recovery inlets 41 to 43 provided on the side of the stern 12 of the ship bottom 13, air recovery chambers 51 to 53, and a flow passage 70. The air recovery chambers 51 to 53 have a gas-liquid separation function. For example, it is possible to apply a gas-liquid separation chamber disclosed in Japanese Patent Publication JP 2009-248831A to the air recovery chambers 51 to 53. The air recovery chambers 51 to 53 can be referred to as gas-liquid separation chambers 51 to 53 when they have a gas-liquid separation function. The air recovery inlets 41 to 43 are arranged on the side of the stern 12 compared with the air ejecting outlets 31 to 33, and on the side of the bow 11 compared with the propeller 16. The air recovery inlet 41 is formed in a bottom plate of the air recovery chamber 51. The air recovery inlet 42 is formed in a bottom plate of the air recovery chamber 52. The air recovery inlet 43 is formed in a bottom plate of the air recovery chamber 53. The bottom plates of the air recovery chambers 51 to 53 are positioned on the same surface (i.e., flush) as the outer plate of the ship bottom 13.

Figure 1B:
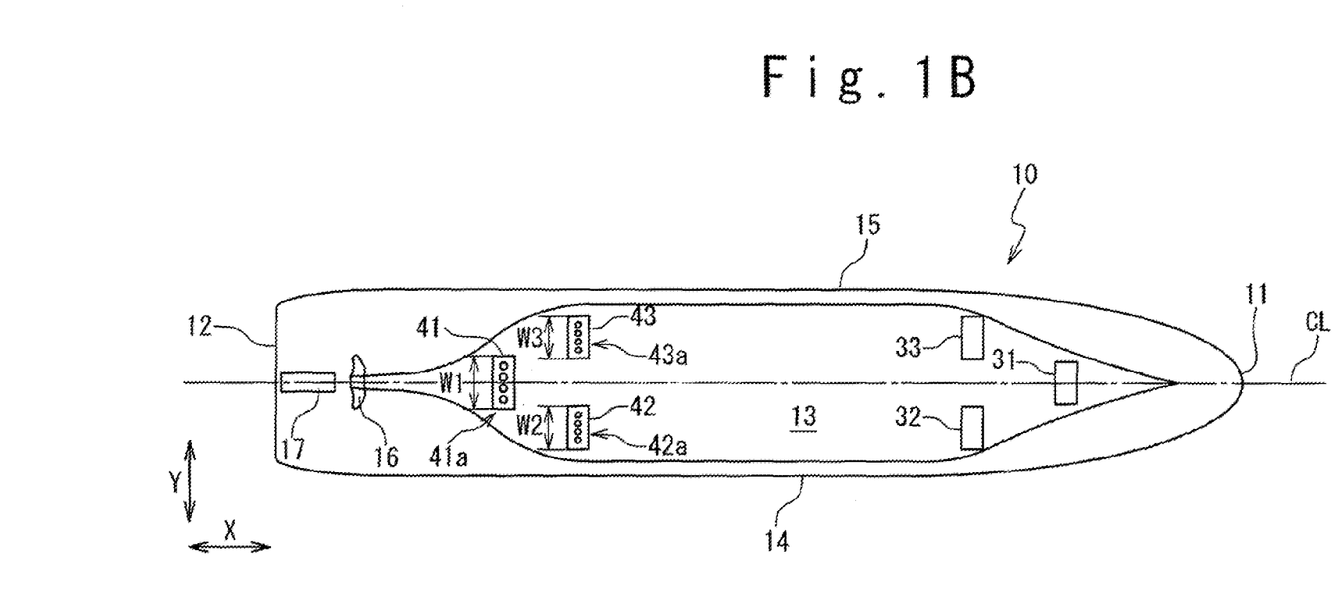
FIG. 1B is a bottom view of the frictional resistance reduced ship according to the first embodiment.

With reference to FIG. 1B, a ship length direction (bow-stern direction) of the ship body 10 and a ship width direction (port-starboard direction) are shown as X- and Y-directions, respectively. The ship body 10 has a port 14 and a starboard 15. The propeller 16 is arranged on a center line CL of the ship body 10. The air recovery inlets 41 to 43 are separated from each other. The air recovery inlets 41, 42, and 43 can be hereinafter referred to as a central air recovery inlet 41, a port-side air recovery inlet 42, and a starboard-side air recovery inlet, respectively.

The air ejecting unit 30 ejects air into water from the air ejecting outlets 31 to 33 at the time of navigation. A flow of air bubbles covers the ship bottom 13, thereby reducing frictional resistance of the ship body 10. When the ship bottom 13 is formed to be a flat surface, the ship bottom 13 is surely covered with the flow of air bubbles since the air bubbles are not likely to dissipate to the sides of the ship body 10 due to buoyancy.

The air recovery device 40 recovers the air ejected into water by the air ejecting unit 30, from the air recovery inlets 41 to 43 into the ship body 10, and emits the air to the atmosphere. More in detail, seawater which includes the air bubbles, flows into the gas-liquid separation chambers 51 to 53 through the air recovery inlets 41 to 43, respectively. The gas-liquid separation chambers 51 to 53 separate air from the seawater. The air as a result of the separation is emitted to the atmosphere through the flow passage 70.

Since the air recovery device 40 recovers air on the side of the bow 11 compared with the propeller 16, the air bubbles are prevented from being taken in the propeller 16.

The central air recovery inlet 41 includes a plurality of air recovery holes 41a; the port-side air recovery inlet 42 includes a plurality of air recovery holes 42a; and the starboard-side air recovery inlet 43 includes a plurality of air recovery holes 43a. The central air recovery inlet 41 is formed in a belt-like shape extending in the ship width direction Y, and provided to cross the center line CL. The port-side air recovery inlet 42 is formed in a belt-like shape extending in the ship width direction Y, and provided not on the center line CL but on the side of the port 14 so that the port-side air recovery inlet 42 projects on the side of the port 14 compared with the central air recovery inlet 41. The starboard-side air recovery inlet 43 is formed in a belt-like shape extending in the ship width direction Y, and provided not on the center line CL but on the side of the starboard 15 so that the starboard-side air recovery inlet 43 projects on the side of the starboard 15 compared with the central air recovery inlet 41. The port-side air recovery inlet 42 and the starboard-side air recovery inlet 43 are arranged on the side of the bow 11 compared with the central air recovery inlet 41. For example, a position of the port-side air recovery inlet 42 in the ship length direction X and a position of the starboard-side air recovery inlet 43 in the ship length direction X are coincident with each other.

Since the air recovery inlets 41 to 43 are formed in the above way, the strength of the ship body 10 against longitudinal bending caused by sagging and hogging is secured and maintained, compared with a case where the air recovery inlet 41 to 43 are arranged in the same position in the ship length direction X. Since the air recovery inlets 41 to 43 are provided in a wide area in the ship width direction Y, it is possible to collect or recover air in the wide area in the ship width direction Y of the ship bottom 13. The air bubbles are surely prevented from being taken in the propeller 16 since the central air recovery inlet 41 is positioned nearer to the propeller 16 than the port-side air recovery inlet 42 and the starboard-side air recovery inlet 43. The air bubbles are more surely prevented from being taken in the propeller 16, by increasing a width W1 of the central air recovery inlet 41 in the ship width direction Y, than a width W2 of the port-side air recovery inlet 42 in the ship width direction Y and a width W3 of the starboard-side air recovery inlet 43 in the ship width direction Y.

It should be noted that the air recovery device 40 may have a flow passage 71 for supplying the recovered air to the compressor or the blower 34 in a pressure higher than atmospheric pressure. When the compressor or the blower 34 ejects the air supplied from the air recovery device 40, from the air ejecting outlets 31 to 33 into water, energy for air ejection can be reduced compared with a case where air taken from the atmosphere is ejected.

Figure 2A:
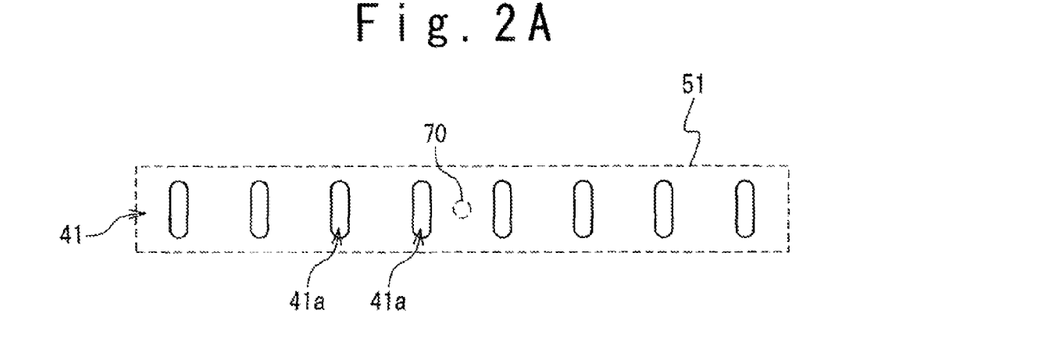
FIG. 2A shows an example of an air recovery inlet provided to the frictional resistance reduced ship according to the first embodiment.

FIG. 2A shows an example of the central air recovery inlet 41. The air recovery holes 41a included in the central air recovery inlet 41 are a plurality of long holes arranged in a longitudinal direction of the central air recovery inlet 41 (e.g. the ship width direction Y). The longitudinal direction of each air recovery hole 41a is perpendicular to the longitudinal direction of the central air recovery inlet 41. In this case, the strength of the ship body 10 against longitudinal bending is secured and maintained since spaces between the adjacent air recovery holes 41a are increased compared with a case where the air recovery holes 41a are replaced by circular holes with the same hole area. The port-side air recovery inlet 42 and the starboard-side air recovery inlet 43 are formed in the same way as the central air recovery inlet 41.

Figure 2B:
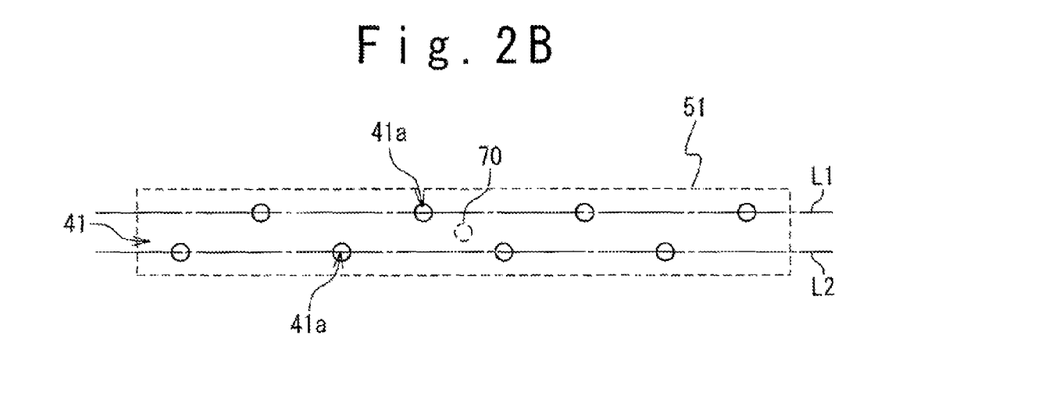
FIG. 2B shows another example of the air recovery inlet provided to the frictional resistance reduced ship according to the first embodiment.

FIG. 2B shows another example of the central air recovery inlet 41. The air recovery holes 41a included in the central air recovery inlet 41 are a plurality of circular holes arranged along two straight lines L1 and L2 parallel to each other and extending into the longitudinal direction of the central air recovery inlet 41 (e.g. the ship width direction Y). The circular holes arranged along the straight line L1 and the circular holes arranged along the straight line L2 have different positions along the longitudinal direction of the central air recovery inlet 41. For example, the air recovery holes 41a included in the central air recovery inlet 41 are arranged in a zigzag form. In this case, the strength of the ship body 10 against longitudinal bending is secured and maintained compared with a case where the air recovery holes 41a are arranged along a single straight line. The port-side air recovery inlet 42 and the starboard-side air recovery inlet 43 are formed in the same way as the central air recovery inlet 41.

Figure 2C:
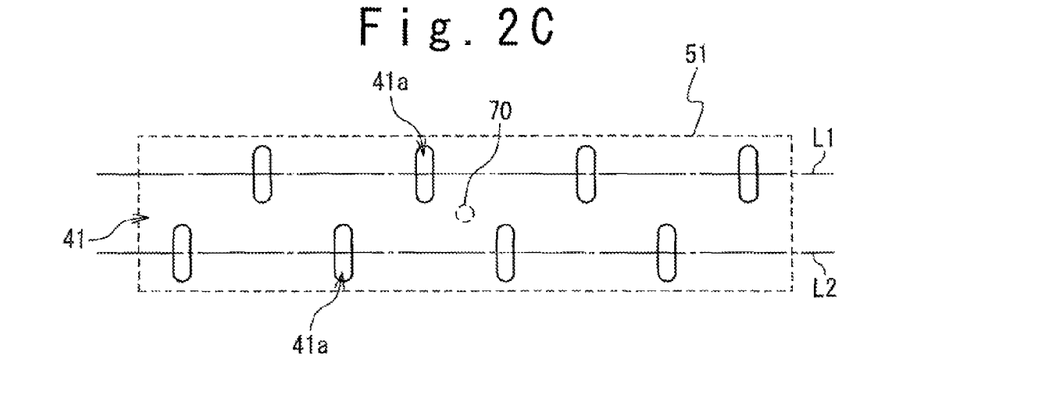
FIG. 2C shows still another example of the air recovery inlet provided to the frictional resistance reduced ship according to the first embodiment.

FIG. 2C is still another example of the central air recovery inlet 41. The central air recovery inlet 41 shown in FIG. 2C is the same as the central air recovery inlet 41 shown in FIG. 2B, excluding a point that the circular holes are replaced by the long holes with the same hole area. The longitudinal direction of each long hole is perpendicular to the longitudinal direction of the central air recovery inlet 41. In this case, the strength of the ship body 10 against longitudinal bending is secured and maintained compared with the case of FIG. 2B. The port-side air recovery inlet 42 and the starboard-side air recovery inlet 43 are formed in the same way as the central air recovery inlet 41.

Second Embodiment

Figure 3:
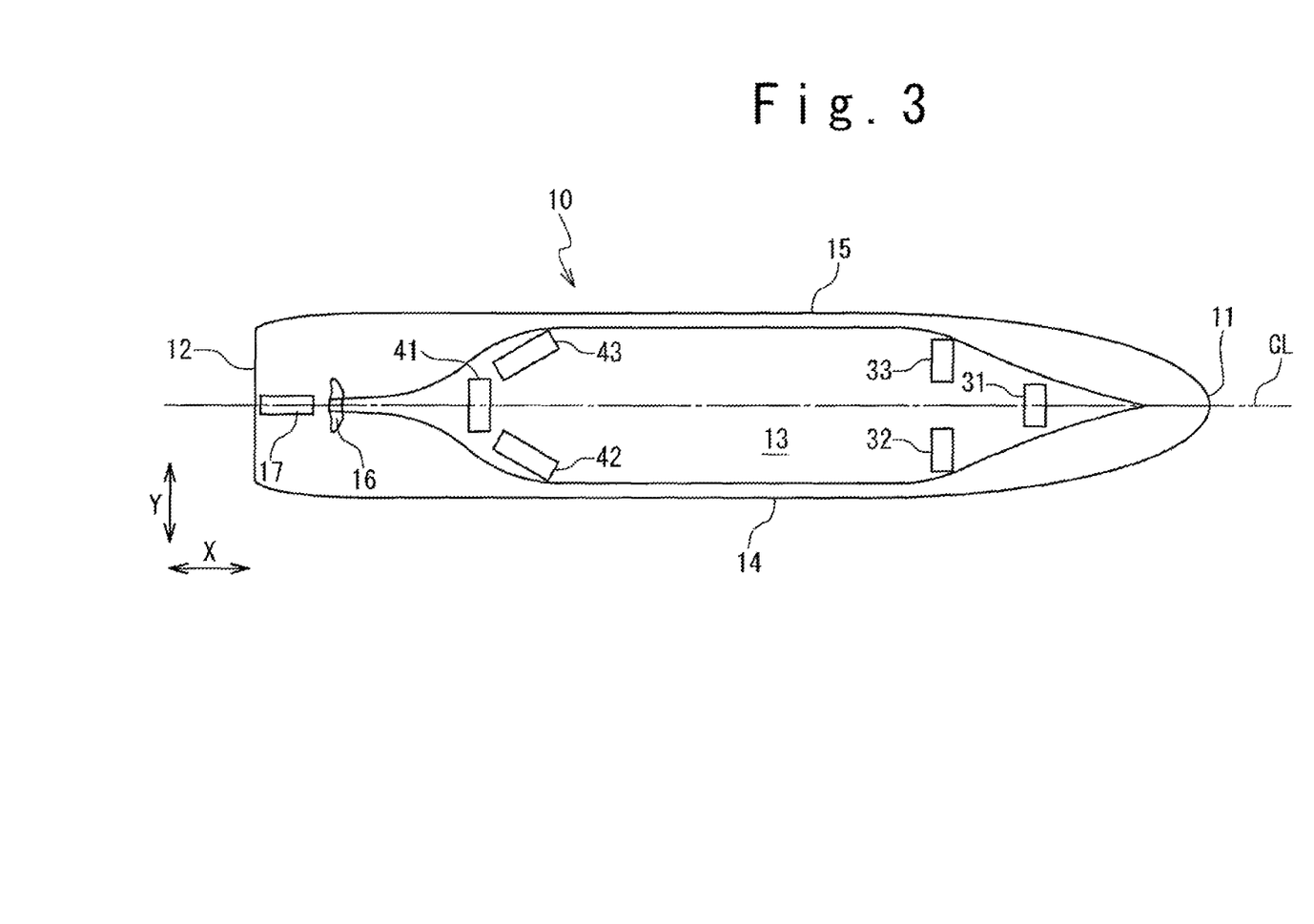
FIG. 3 is a bottom view of the frictional resistance reduced ship according to a second embodiment of the present invention.

With reference to FIG. 3, the frictional resistance reduced ship according to a second embodiment of the present invention is the same as the frictional resistance reduced ship according to the first embodiment, excluding the following points. A port-side air recovery inlet 42 and a starboard-side air recovery inlet 43 are formed in a belt-like shape extending obliquely with respect to a ship length direction X, so that the respective ends of the port-side air recovery inlet 42 and the starboard-side air recovery inlet 43 on the side of the stern 12 are nearer to a center line CL and the other ends on the side of the bow 11 are far from the center line CL.

According to the present embodiment, the ends nearer to the propeller 16, of the port-side air recovery inlet 42 and the starboard-side air recovery inlet 43 are positioned near to the center line CL, thereby preventing air bubbles from being taken in the propeller 16.

Third Embodiment

Figure 4:
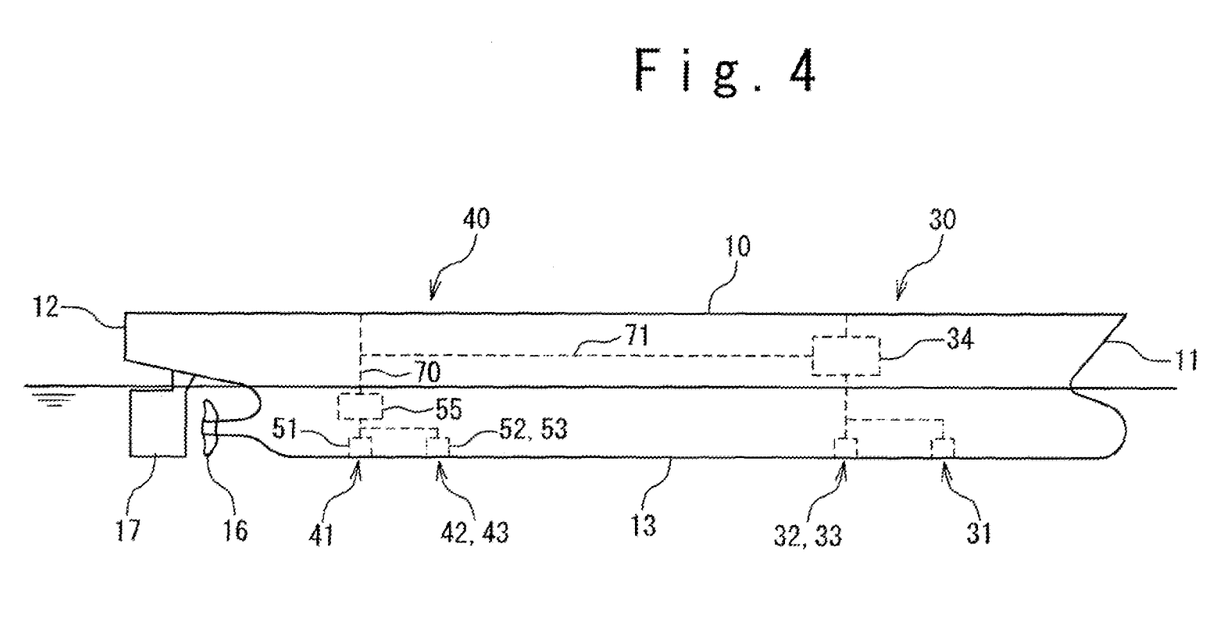
FIG. 4 is a side view of the frictional resistance reduced ship according to a third embodiment of the present invention.

With reference to FIG. 4, the frictional resistance reduced ship according to a third embodiment of the present invention will be described. The frictional resistance reduced ship according to the present embodiment is the same as the frictional resistance reduced ship according to the first embodiment, excluding the following point. In the present embodiment, the air recovery chambers 51 to 53 do not have a gas-liquid separation function, and the air recovery device 40 has a single gas-liquid separation chamber 55. Seawater which includes the air bubbles, flows into the gas-liquid separation chamber 55 through the air recovery inlet 41 to 43. The gas-liquid separation chamber 50 separates the air from the seawater. The air as a result of the separation is emitted to the atmosphere through the flow passage 70, or supplied to the compressor or the blower 34 through the flow passage 71.

Fourth Embodiment

Figure 5A:
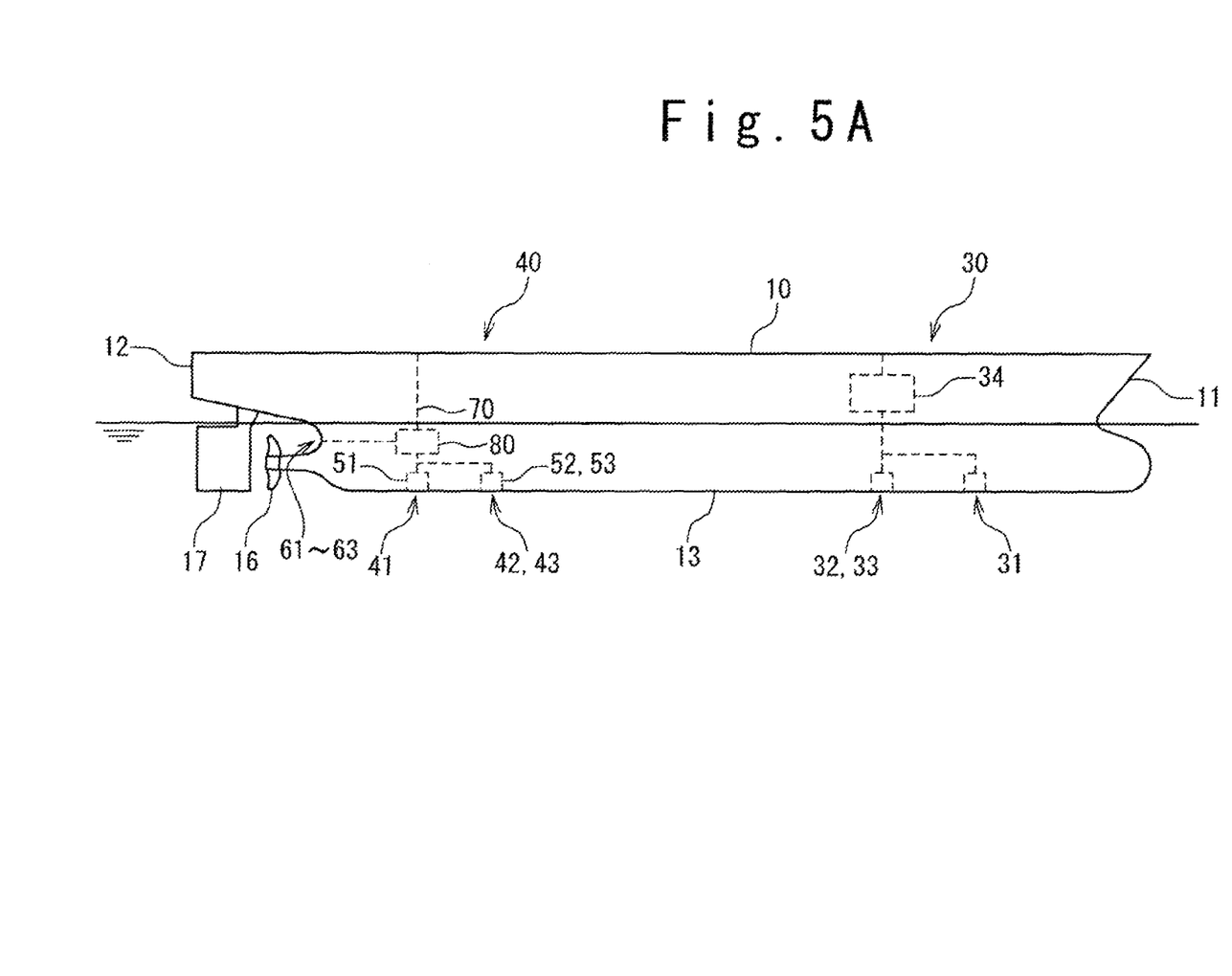
FIG. 5A is a side view of the frictional resistance reduced ship according to a fourth embodiment of the present invention.

With reference to FIG. 5A, the frictional resistance reduced ship according to a fourth embodiment of the present invention will be described. The frictional resistance reduced ship according to the present embodiment is the same as the frictional resistance reduced ship according to the first embodiment, excluding the following point. In the present embodiment, the air recovery device 40 further has a compressor or a blower 80, and air re-ejecting outlets 61 to 63. The air re-ejecting outlets 61 to 63 are provided to a stern portion of the ship body 10. The air re-ejecting outlets 61 to 63 are positioned higher than the air recovery inlets 41 to 43, and positioned on the side of the stern 12 compared with the air recovery inlets 41 to 43. The air re-ejecting outlets 61 to 63 are positioned on the side of the bow 16 compared with the propeller 16.

Figure 5B:
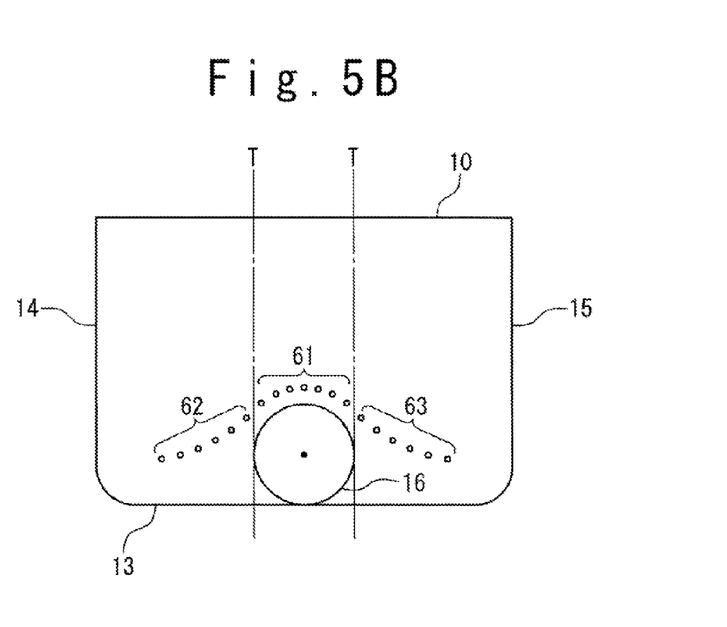
FIG. 5B is a back view of the frictional resistance reduced ship according to the fourth embodiment.

With reference to FIG. 5B, the positions of the air re-ejecting outlets 61 to 63 when the ship body 10 is viewed from the stern 12 side will be described. In FIG. 5B, the helm 17 is not shown but two tangent lines T to a circle of the propeller 16 are shown. The two tangent lines T are perpendicular to a ship length direction X and a ship width direction Y. When the ship body 10 is viewed from the stern 12, the air re-ejecting outlets 61 to 63 are not arranged lower than a circle of the propeller 16 in a region between the two tangent lines T. That is to say, the air re-ejecting outlets 61 to 63 are not arranged below the propeller 16, when the ship body 10 is viewed from the stern 12. When the ship body 10 is viewed from the stern 12, the air re-ejecting outlet 61 is arranged higher than the propeller 16 circle in the region between the two tangent lines T. That is to say, the air re-ejecting outlet 61 is arranged above the propeller 16, when the ship body 10 is viewed from the stern 12. When the ship body 10 is viewed from the stern 12, the air re-ejecting outlet 62 is arranged outside the two tangent lines T on the side of the port 14, and the air re-ejecting outlet 63 is arranged outside the two tangent lines T on the side of the starboard 15. That is to say, the air re-ejecting outlets 62 and 63 are positioned outside the width of the propeller 16, when the ship body 10 is viewed from the stern 12. In this way, the air re-ejecting outlets 61 to 63 are provided not to overlap with streamlines which pass through the propeller 16 circle.

The compressor or the blower 80 ejects the air separated from the seawater in the gas-liquid separation chambers 51 to 53, into water from the air re-ejecting outlets 61 to 63. Consequently, an area covered with the air bubbles in the ship body 10 is increased and frictional resistance of the ship body 10 is further reduced. Since the air re-ejecting outlets 61 to 63 are not arranged below the propeller 16 when the ship body 10 is viewed from the stern 12, the air bubbles ejected from the air re-ejecting outlets 61 to 63 are prevented from being taken in the propeller 16.

Furthermore, the air bubbles ejected from the air re-ejecting outlet 61 cover a portion immediately above the propeller 16 of the ship body 10, thereby reducing propagation of vibrations from the propeller 16 to the ship body 10 and improving comfort of sailors and passengers.

If only the air re-ejecting outlets 62 and 63 are provided outside the width of the propeller 16 when the ship body 10 is viewed from the stern 12, the air bubbles are more surely prevented from being taken in the propeller 16.

According to the present embodiment, the air recovered from the air recovery inlets 41 to 43, is ejected from the air re-ejecting outlets 61 to 63, thereby reducing energy for air ejection compared with a case where air taken from the atmosphere is ejected from air re-ejecting outlets 61 to 63.

Figure 5C:
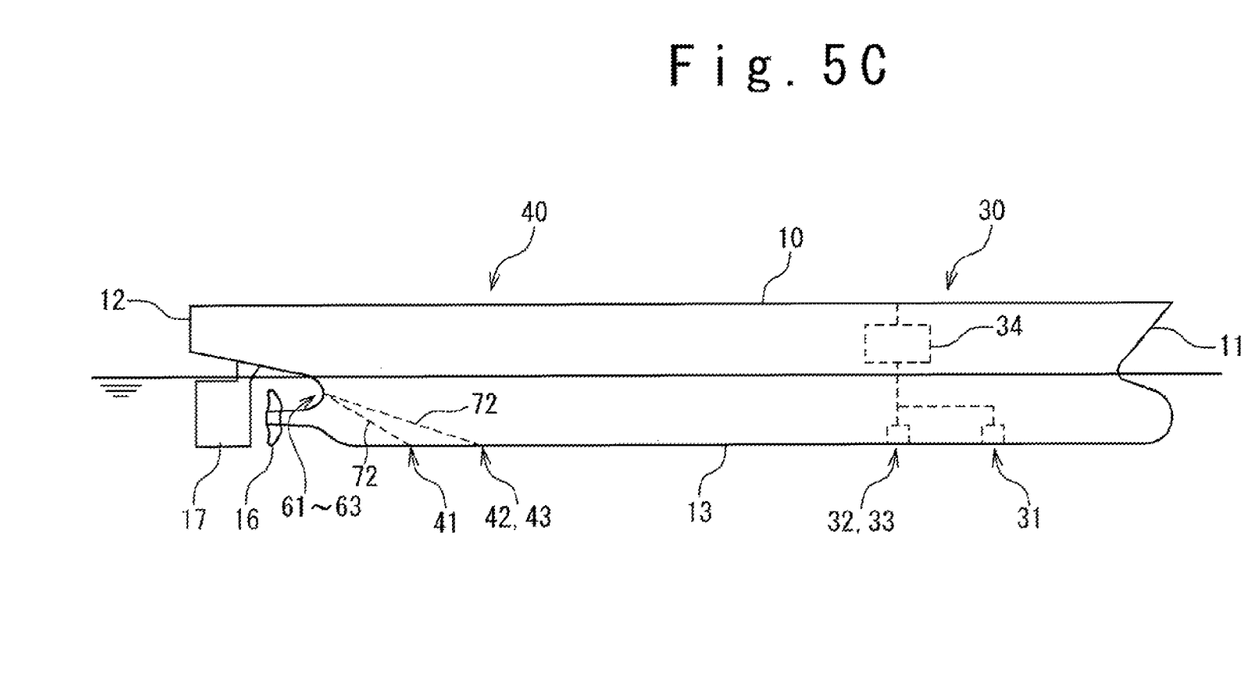
FIG. 5C is a side view of the frictional resistance reduced ship according to a modification of the fourth embodiment.

With reference to FIG. 5C, the frictional resistance reduced ship according to a modification of the present embodiment will be described. The frictional resistance reduced ship according to the modification is the same as the frictional resistance reduced ship according to the fourth embodiment, excluding the following point. Since the air re-ejecting outlets 61 to 63 are arranged higher than the air recovery inlet 41 to 43, and arranged on the side of the stern 12 compared with the air recovery inlets 41 to 43, the air recovery inlets 41 to 43 are connected to the air re-ejecting outlets 61 to 63 without the air recovery chambers 51 to 53, and the compressor or the blower 80, in the modification. The air recovery device 40 has a flow passage 72 which extend obliquely upward from the air recovery inlet 41 to the air re-ejecting outlet 61, a flow passage 72 which extends obliquely upward from the air recovery inlet 42 to the air re-ejecting outlet 62, and a flow passage 72 which extends obliquely upward from the air recovery inlet 43 to the air re-ejecting outlet 63. The seawater which includes the air bubbles and flows into the ship body 10 from the air recovery inlet 41 to 43, is discharged from the air re-ejecting outlets 61 to 63 through the flow passages 72.

Fifth Embodiment

Figure 6A:
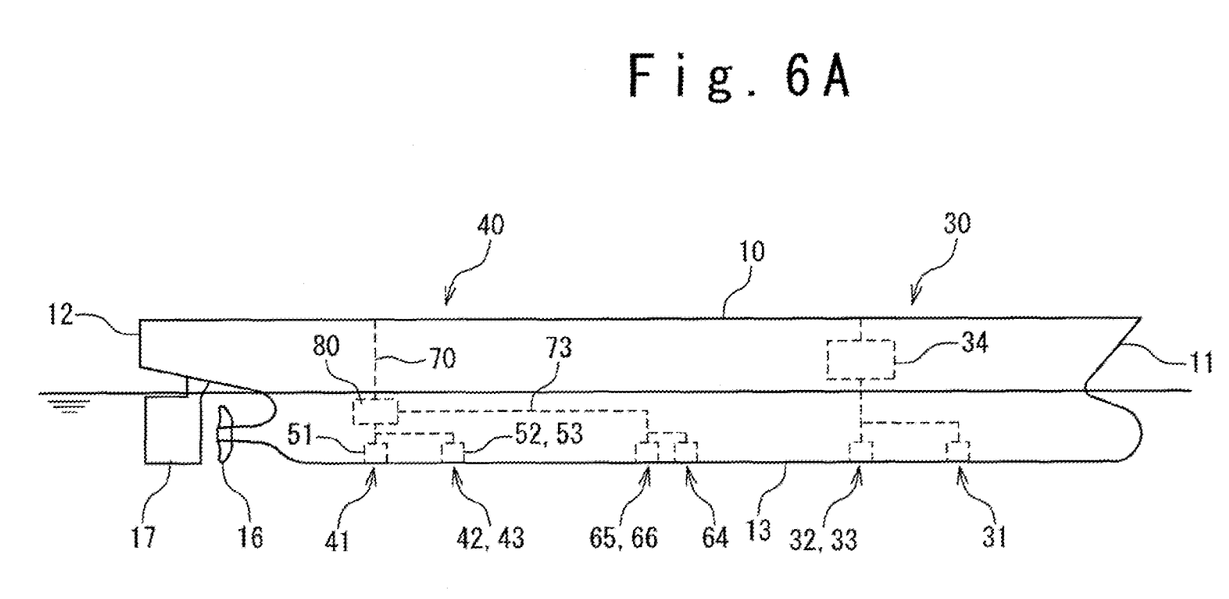
FIG. 6A is a side view of the frictional resistance reduced ship according to a fifth embodiment of the present invention.

With reference to FIG. 6A, the frictional resistance reduced ship according to a fifth embodiment of the present invention will be described. The frictional resistance reduced ship according to the present embodiment is the same as the frictional resistance reduced ship according to the first embodiment, excluding the following point. In the present embodiment, the air recovery device 40 further has the compressor or the blower 80, air re-ejecting outlets 64 to 66 provided in the middle of the ship bottom 13, and a flow passage 73. The air re-ejecting outlets 64 to 66 are arranged on the side of the stern 12 compared with the air ejecting outlets 31 to 33, and arranged on the side of the bow 11 compared with the air recovery inlets 41 to 43. The compressor or the blower 80 is connected to the air re-ejecting outlets 64 to 66 through the flow passage 73.

Figure 6B:
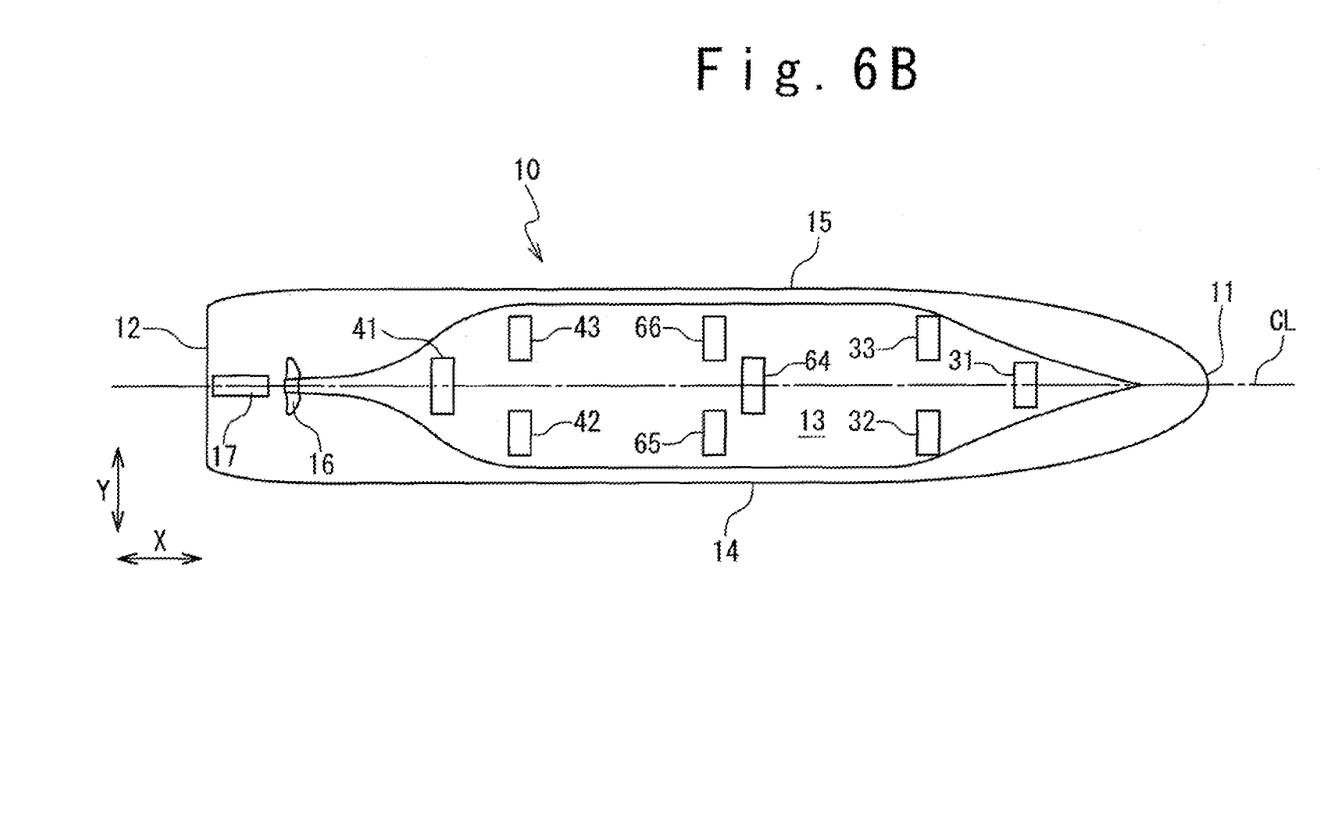
FIG. 6B is a bottom view of the frictional resistance reduced ship according to the fifth embodiment.

With reference to FIG. 6B, the air re-ejecting outlets 64 to 66 are separated from each other.

The air recovery device 40 ejects the air recovered from the air recovery inlet 41 to 43 into the ship body 10, from the air re-ejecting outlets 64 to 66 into water. More in detail, the compressor or the blower 80 ejects the air separated by the gas-liquid separation chambers 51 to 53, from the air re-ejecting outlets 64 to 66 into water. Since a density of the air bubbles is increased by covering a portion on the side of the stern 12 from the air re-ejecting outlets 64 to 66 in the ship bottom 13, the frictional resistance of the ship body 10 is further reduced.

According to the present embodiment, the air recovered from the air recovery inlets 41 to 43, is ejected from the air re-ejecting outlets 64 to 66, thereby reducing energy for air ejection compared with a case where the air taken from the atmosphere is ejected from the air re-ejecting outlets 64 to 66.

Since the air re-ejecting outlets 64 to 66 are arranged on the side of the stern 12 compared with the air ejecting outlets 31 to 33 and on the side of the bow 11 compared with the air recovery inlets 41 to 43, the flow passage 73 may be short compared with a flow passage in a case of ejecting the air recovered from the air recovery inlets 41 to 43, into water from the air ejecting outlets 31 to 33. Therefore, it is possible to easily place the flow passage 73 in the ship body 10 and reduce pressure loss due to resistance of the flow passage 73.

Each of the air re-ejecting outlets 64 to 66 includes a plurality of air ejecting holes, as in the case of the air recovery inlets 41 to 43. The air re-ejecting outlet 64 is formed in a belt-like shape extending in the ship width direction Y, and provided to cross the center line CL. The air re-ejecting outlet 65 is formed in a belt-like shape extending in the ship width direction Y, and provided not on the center line CL but on the side of port 14 so that the air re-ejecting outlet 65 projects on the side of the port 14 compared with the air re-ejecting outlet 64. The air re-ejecting outlet 66 is formed in a belt-like shape extending in the ship width direction Y, and provided not on the center line CL but on the side of starboard 15 so that the air re-ejecting outlet 66 projects on the side of the starboard 15 compared with the air re-ejecting outlet 64. The air re-ejecting outlet 65 and the air re-ejecting outlet 66 are arranged on the side of the stern 12, compared with the air re-ejecting outlet 64. For example, the position of the air re-ejecting outlet 65 in the ship length direction X and the position of the air re-ejecting outlet 66 in the ship length direction X are coincident with each other.

Since the air re-ejecting outlets 64 to 66 are formed in the above way, the air can be ejected from a range which is wide in the ship width direction Y of the ship bottom 13, while securing and maintaining the strength of the ship body 10 against longitudinal bending. It should be note that the air re-ejecting outlet 65 and the air re-ejecting outlet 66 may be arranged on the side of the bow 11, compared with the air re-ejecting outlet 64.

The air ejecting holes of the air re-ejecting outlets 64 to 66 are formed in the same way as the air recovery holes 41a shown in FIGS. 2A to 2C, for example.

It is possible to eject the air from a range which is wide in the ship width direction Y of the ship bottom 13 while securing and maintaining the strength of the ship body 10 against longitudinal bending in a portion on the side of the bow 11 of the ship bottom 13, by forming the air ejecting outlets 31 to 33 in the same way as the air re-ejecting outlets 64 to 66.

Though the frictional resistance reduced ship according to the present invention has been described above with reference to the embodiments, the frictional resistance reduced ship according to the present invention is not limited to the above embodiments. Various modifications may be made to the above embodiments. A matter disclosed in an embodiment mentioned above, and a matter disclosed in another embodiment mentioned above, can be combined.

What is claimed is:

1. A frictional resistance reduced ship comprising:
a ship body having a ship bottom with an outer plate;
an air ejecting outlet disposed in said ship bottom;
air recovery inlets disposed in said ship bottom;
an air ejecting unit configured to eject air into water from said air ejecting outlet;
an air recovery device configured to recover the air into said ship body from said air recovery inlets; and
bottom plates having said air recovery inlets formed thereon, and being disposed flush with the outer plate of the ship bottom,
wherein said air recovery inlets are arranged on a stern side relative to said air ejecting outlet and on a bow side relative to a propeller provided to said ship body,
wherein said air recovery inlets comprise
a central air recovery inlet crossing a center line of said ship body;

a port-side air recovery inlet disposed not on the center line but on a port side so that said port-side air recovery inlet projects on the port side from said central air recovery inlet; and a starboard-side air recovery inlet disposed not on the center line but on a starboard side so that said starboard-side air recovery inlet projects on the starboard side from said central air recovery inlet, wherein said port-side air recovery inlet and said starboard-side air recovery inlet are arranged on the bow side relative to said central air recovery inlet, and wherein each of said central air recovery inlet, said port-side air recovery inlet, and said starboard-side air recovery inlet comprises a plurality of air recovery holes.

2. The frictional resistance reduced ship according to claim 1, wherein a first width of said central air recovery inlet in a ship width direction is larger than a second width of said port-side air recovery inlet in the ship width direction and a third width of said starboard-side air recovery inlet in the ship width direction.

3. The frictional resistance reduced ship according to claim 1, wherein each of said central air recovery inlet, said port-side air recovery inlet, and said starboard-side air recovery inlet has a belt shape extending in a ship width direction.

4. The frictional resistance reduced ship according to claim 1, wherein said central air recovery inlet has a belt shape extending in a ship width direction, and wherein each of said port-side air recovery inlet and said starboard-side air recovery inlet has a belt shape extending obliquely to a ship length direction such that respective first ends of said port-side air recovery inlet and said starboard-side air recovery inlet on the stern side are close to the center line, and respective second ends on the bow side are far from the center line.

5. The frictional resistance reduced ship according to claim 1, wherein said air recovery device comprises a gas-liquid separation chamber configured to separate the air from the water.

6. The frictional resistance reduced ship according to claim 1, wherein said ship bottom is a flat surface.

7. The frictional resistance reduced ship according to claim 1, wherein said air recovery device is configured to eject the air into the water from a first air re-ejecting outlet disposed on said ship body, and wherein said first air re-ejecting outlet is arranged on the stern side relative to said air recovery inlet such that said first air re-ejecting outlet is not arranged below said propeller when said ship body is viewed from a stern of said ship.

8. The frictional resistance reduced ship according to claim 7, wherein said first air re-ejecting outlet is arranged on the bow side relative to said propeller such that said first air re-ejecting outlet is arranged above said propeller when said ship body is viewed from said stern.

9. The frictional resistance reduced ship according to claim 7, wherein said first air re-ejecting outlet is arranged outside a width of said propeller when said ship body is viewed from said stern.

10. The frictional resistance reduced ship according to claim 1, wherein said air recovery device is configured to eject the air into the water from a second air re-ejecting outlet disposed on said ship bottom, and wherein said second air re-ejecting outlet is arranged on the stern side relative to said air ejecting outlet and on the bow side relative said air recovery inlet.

* * * * *